(12) United States Patent
Akondy et al.

(10) Patent No.: US 9,811,112 B2
(45) Date of Patent: Nov. 7, 2017

(54) ADAPTIVE CLOCK DELAY COMPENSATION

(71) Applicant: TEXAS INSTRUMENTS INCORPORATED, Dallas, TX (US)

(72) Inventors: Subrahmanya Bharathi Akondy, Houston, TX (US); Steven Brett Larimore, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/997,862

(22) Filed: Jan. 18, 2016

(65) Prior Publication Data

US 2017/0205845 A1    Jul. 20, 2017

(51) Int. Cl.
*G06F 1/12*    (2006.01)

(52) U.S. Cl.
CPC ..................... *G06F 1/12* (2013.01)

(58) Field of Classification Search
CPC ........................................................ G06F 1/12
See application file for complete search history.

(56) References Cited

U.S. PATENT DOCUMENTS

| 8,565,033 B1* | 10/2013 | Manohararajah | G11C 29/028 365/129 |
|---|---|---|---|
| 2004/0030853 A1* | 2/2004 | Welker | G06F 13/4217 711/163 |
| 2009/0106460 A1* | 4/2009 | Suenaga | G06F 1/12 710/13 |
| 2012/0201087 A1* | 8/2012 | Mizuno | H05K 1/0218 365/193 |
| 2015/0310903 A1* | 10/2015 | Bansal | G11C 7/222 365/194 |
| 2015/0380067 A1* | 12/2015 | Singh | G11C 7/1057 365/189.05 |
| 2016/0308540 A1* | 10/2016 | Subramanian | G06F 13/1689 |

* cited by examiner

*Primary Examiner* — Nitin Patel
*Assistant Examiner* — Kevin Stewart
(74) *Attorney, Agent, or Firm* — John R. Pressetto; Charles A. Brill; Frank D. Cimino

(57) ABSTRACT

A system includes a CPU, a serial interface, and an adaptive clock delay compensator. The adaptive clock delay compensator is configured to generate a clock signal at a first frequency, detect an edge on a data signal, and count the number of clock cycles of a counter clock to measure the delay between an edge of the clock signal and the detected edge on the data signal to produce a first delay value. The CPU is configured to convert the first delay value to a different clock domain at a second frequency to produce a converted delay value, and initiate a data transfer operation using the second frequency as a clock signal. The adaptive clock delay compensator is configured to generate a delayed clock signal at the second frequency to the serial interface that is delayed from the clock signal at the second frequency by the converted delay value.

17 Claims, 3 Drawing Sheets

ADAPTIVE CLOCK DELAY COMPENSATION

BACKGROUND

Many communication systems include devices communicating over electrical cables. For example, a control circuit may request a remote peripheral device to transmit data back to the control circuit. The control circuit submits its request to the remote peripheral device. The communication between control circuit and remote peripheral device may include a data signal and one or more control signals, such as a clock signal. Successful communication between the control circuit and the remote peripheral device may occur only if the timing of the data signals relative to the edges of the clock signal is carefully controlled. As the length of the cable interconnecting the control circuit and the peripheral device increases, so does the time delay for the control circuit to receive data from the peripheral device after generating a clock edge. The timing between the clock generated by the control circuit and the data generated by the remote peripheral device may become problematic as the time delay increases for signals to traverse the cable and the clock frequency also increases. For example, if the control circuit expects to receive a data signal after generating an initial clock edge but before generating the next corresponding clock edge, the time delay introduced by the length of the cable may result in the data signal being received by the control circuit multiple clock cycles later, thereby causing data synchronicity problems.

SUMMARY

Various embodiments of a system and method are disclosed herein that pertain to a device that can engage in data transfer operations with a remote device. The distance between the devices can vary and may be long enough so as to cause timing problems for the data transfer phase. To address that problem, the system includes an adaptive clock delay compensation circuit that measures the amount of delay between the devices during a delay measurement mode and then uses the measured delay during a subsequent data transfer mode by generating a clock signal to the remote device and a delayed version of the same clock signal to a data interface. The delayed clock helps the data interface correctly receive the data from the remote device taking into account the propagation delays along the cable between the devices. The delay is measured automatically and thus auto-scales to devices connected by different length cables.

In one embodiment, a system includes a central processing unit (CPU), a serial interface, and an adaptive clock delay compensator. The adaptive clock delay compensator is configured to generate a clock signal at a first frequency, detect an edge on a data signal, and count the number of clock cycles of a counter clock to measure the delay between an edge of the clock signal and the detected edge on the data signal to produce a first delay value. The CPU is configured to convert the first delay value to a different clock domain at a second frequency to produce a converted delay value, and initiate a data transfer operation using the second frequency as a clock signal. The adaptive clock delay compensator is configured to generate a delayed clock signal at the second frequency to the serial interface that is delayed from the clock signal at the second frequency by the converted delay value.

In another embodiment, a system comprises a data interface configured to receive data from, or send data to, a peripheral device. The system further includes a clock generator, an edge detector, a counter and a CPU. The clock generator is configured to generate and transmit a first clock signal at a first frequency to the peripheral device. The edge detector is configured to detect an edge of the first clock signal and an edge of a data signal responsive to the edge of the first clock signal. The counter configured to count cycles of a counter clock that occur between the detected edges of the first clock signal and the data signal to produce a first count value. The counter clock has a counter clock frequency. The CPU is configured to convert the first count value to a second count value of a clock domain which has a second frequency that is smaller than the counter clock frequency. The clock generator is further configured to change the frequency of the first clock signal to the second frequency for a data transfer operation and to generate and transmit a delayed clock to the data interface for the data transfer operation. The delayed clock is also of the second frequency but is delayed with respect to the first clock by the second count value.

In a method embodiment, the method includes generating a clock edge of a clock having a first frequency, detecting a subsequent data edge, counting clock cycles of a counter clock between the clock and data edges to produce a first delay value, and converting the delay value to a second delay value based, at least in part, on a second frequency. The second frequency is different than the first frequency. The method further may include writing the second delay value to a register.

BRIEF DESCRIPTION OF THE DRAWINGS

For a detailed description of various examples, reference will now be made to the accompanying drawings in which.

DETAILED DESCRIPTION

Figure 1:
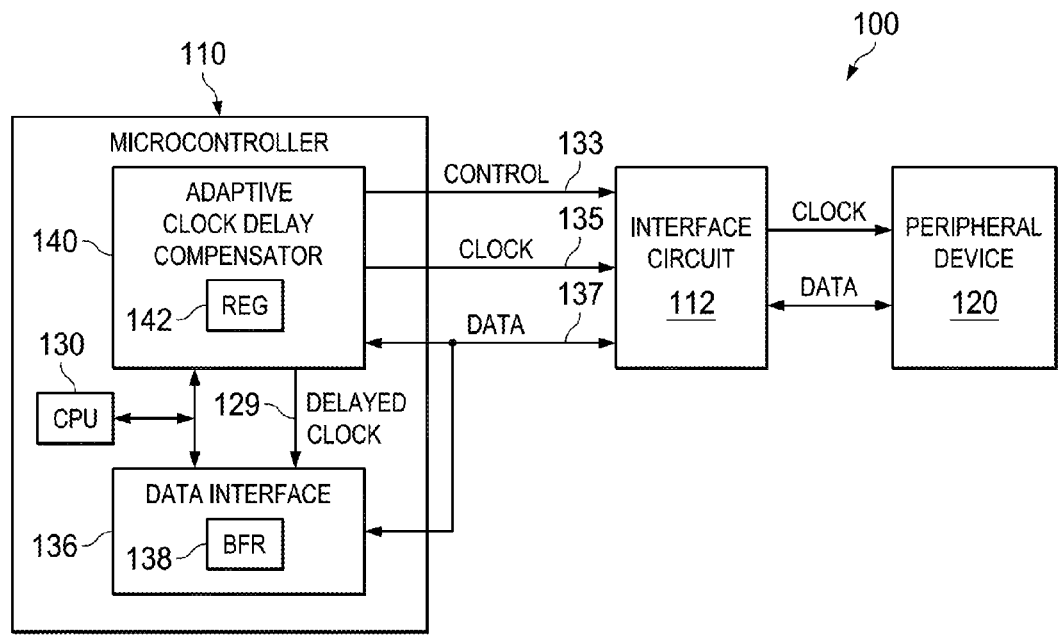
FIG. 1 shows a system of a microcontroller including an adaptive clock delay compensator in communication with a peripheral device in accordance with various examples.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections.

This disclosure describes a system in which a control circuit can communicate with a remote peripheral device while automatically compensating for time delays due to, for example, the length of the electrical cable interconnecting the control circuit and peripheral device. In one embodiment, the control circuit is or includes a microcontroller and the peripheral device is or includes a position encoder, but the function of the peripheral device can be other than for encoding position.

The control circuit includes an adaptive clock delay compensator circuit that can operate in a delay measurement mode and a data transfer mode. While in the delay measurement mode, the adaptive clock delay compensator circuit measures the amount of delay between an edge of low frequency clock (lower than the clock used during the data transfer mode) and an edge of a data signal from the peripheral device. In some embodiments, the adaptive clock delay compensator circuit generates a clock edge and counts cycles of a relatively high frequency counter clock until it detects the data signal edge. The number of clock cycles of the high frequency counter clock represents the delay value due, at least in part, to the cable length. The frequency of the clock generated by the control circuit to the peripheral device during the data transfer mode is smaller than the frequency of the high frequency counter clock used to measure the delay. Because the delay is measured in units of the number of clock cycles of the high frequency counter clock, the control circuit converts the delay value measured using the counter clock to a different clock domain which is a lower frequency clock (lower than the counter clock frequency) used for data transfer operations.

During the data transfer mode, the adaptive clock delay compensator circuit generates two clock signals—one clock signal is generated for the peripheral device and another clock signal is generated for a data interface. The data interface receives the requested data from the peripheral device. Both of these clock signals have the same frequency but the data interface clock signal is delayed by the adaptive clock delay compensator circuit with respect to the peripheral device clock signal by the delay value measured during the delay measurement mode and converted to the clock domain of the data transfer clock.

In this way, the timing of the clock signal generated during the data transfer operation and the received data signals is controlled based on the measured delay. The delay measurement mode can be performed automatically during initialization of the control circuit and scales automatically with the length of the cable.

FIG. 1 shows an example of a system 100 including a microcontroller 110 coupled to a peripheral device 120 via an interface circuit 112 (e.g., RS-485 interface). The interface circuit 112 may adjust the magnitude of voltages and provide appropriate impedance matching to permit the microcontroller 110 and peripheral device 120 to exchange clock and data signals. The peripheral device can be any type of device. An example of a peripheral device is a position encoder, but other devices are possible as well such as sensors of various kinds. The interface circuit 112 may be part of, or separate from, the peripheral device.

The microcontroller 110 includes a central processing unit (CPU) 130, a data interface 136, and an adaptive clock delay compensator 140. The CPU 130 may couple to the data interface 136 and the adaptive clock delay compensator 140 as shown, but in other embodiments, the connection between the components can be different from that shown in FIG. 1. The data interface may be a serial data interface. In some embodiments, the data interface is a serial data interface such as the Serial Peripheral Interface (SPI). The CPU 130 may be any type of processor core and is configured to execute machine instructions. At least some of the instructions may cause the CPU 130 to initiate a delay compensation mode of operation and a data transfer mode of operation. During the delay compensation mode, the CPU 130 may request the adaptive clock delay compensator 140 to make a measurement of the delay between the microcontroller 110 and the peripheral device. During the data transfer mode, the CPU 110 may request the data interface 136 and the adaptive clock delay compensator 140 to retrieve data from the peripheral device 120 (e.g., position data from a position encoder). Data transmitted by the peripheral device 120 may be temporarily stored in the buffer 138 of the data interface pending retrieval from the buffer 138 by the CPU 130.

The microcontroller 110 may include the components shown in FIG. 1 as well as other components not shown. The microcontroller may be fabricated as a single device such as a system-on-a-chip (SoC). In other embodiments, one or more of the components shown in FIG. 1 may be provided apart from, but coupled to, the microcontroller 110. For example, the data interface 136 may be a physically separate component from the structure on which the CPU 130 and adaptive clock delay compensator are provided.

Referring still to FIG. 1, the microcontroller 110 couples to the interface circuit 112 by way of one or more signal conductors which carry, for example, one or control signals (CONTROL) 133, a clock signal (CLOCK) 135, and a data signal (DATA) 137. The conductors carrying signals 133, 135, and 137 may be provided in a single electrical cable or in one or more separate cables. The length of the cable may vary from application to application and may be long enough so as to cause timing problems for communications between the microcontroller 110 and the peripheral device 120. In accordance with the disclosed embodiments, the adaptive clock delay compensator 140 is configured to measure the amount of time delay in signals traversing the conductors carrying the clock and data signals 135, 137 and to compensate for such delay. As explained below, the register 142 in the adaptive clock delay compensator 140 is used to store a value indicative of the measured time delay which can then be used for compensation during data transmissions. The adaptive clock delay compensator 140 generates a main clock (CLOCK) 135 for transmission to the peripheral device during data transmissions and a delayed version of the main clock (DELAYED CLOCK) 129. The amount of delay between corresponding edges of CLOCK and DELAYED CLOCK equals, or is a function of, the amount of delay measured by the adaptive clock delay compensator 140.

Figure 2:
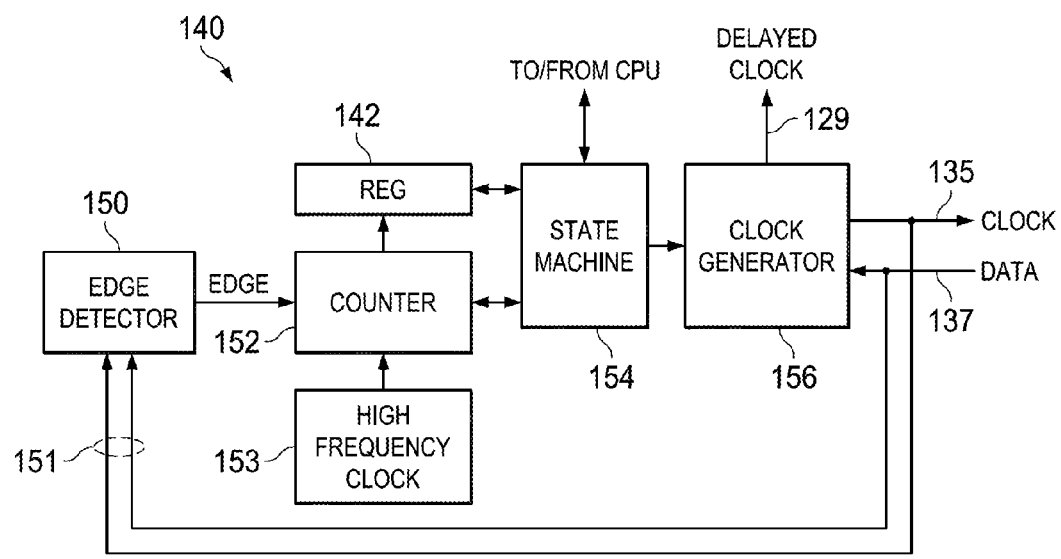
FIG. 2 shows a block diagram of the adaptive clock delay compensator of FIG. 1 in accordance with various examples.

FIG. 2 shows a block diagram of the adaptive clock delay compensator 140 in accordance with various embodiments. In the example of FIG. 2, the adaptive clock delay compensator 140 includes an edge detector 150, a counter 152, a high frequency clock 153 (also termed a "counter clock"), a state machine 154, and a clock generator 156. The clock generator 156 is configurable to generate the clock signal CLOCK to the peripheral device at any of multiple different frequencies. The state machine 156 can configure the clock generator 156 to initiate the generation of CLOCK and at a particular frequency. The state machine 154 also can configure the clock generator 156 to generate the DELAYED CLOCK signal to the data interface 136.

The counter 152 can be triggered by the state machine 154 to count clocks of a high frequency clock 153. The frequency of the high frequency clock 153 may be greater than the frequency of CLOCK during data transmission. For example, the frequency of the high frequency clock 153 may be approximately 10 times greater than the frequency of CLOCK generated during data transmission. In one example, CLOCK during data transmission is a 10 MHz or 16 MHz signal and the high frequency clock is a 100 MHz clock signal. The particular frequencies of CLOCK, DELAYED CLOCK, and the high frequency clock 153 can be different that those particular values in other embodiments.

The edge detector 150 is a circuit that generates an EDGE signal upon detection of an edge of any of its input signals 151. One input to the edge detector 150 includes the CLOCK signal generated by the clock generator 156 and the other input includes the data signal (DATA) from the peripheral device 120. The state machine 154 can enable the edge detector 150 to detect the edges of the input signals. In some embodiments, upon detecting an initial edge of CLOCK, the edge detector 150 may assert its output signal EDGE to a first state (e.g., high). Upon subsequently detecting an edge of DATA, the edge detector 150 may change EDGE to the opposite polarity state (e.g., low). In other embodiments, the edge detector 150 generates two output EDGE signals—each output signal corresponds to one of the input signals to the edge detector. In such embodiments, the edge detector may generate a short duration voltage pulse on each EDGE signal output upon detection of an edge of the corresponding input.

At any rate, the EDGE signal from the edge detector 150 indicates when edges are detected on the CLOCK and DATA signals. The EDGE signal is provided to the counter 152 which is configured to count pulses of the high frequency clock 153 between the detected edges of the CLOCK and DATA signals. The count value thus is indicative of the period of time that elapses between the detected edges. The count value can be written to register 142 by the counter 152 and then read from the register by the state machine 154 and provided to the CPU 130 upon request. The CPU 130 also can write a new count value to register 142 as explained below.

Figure 3:
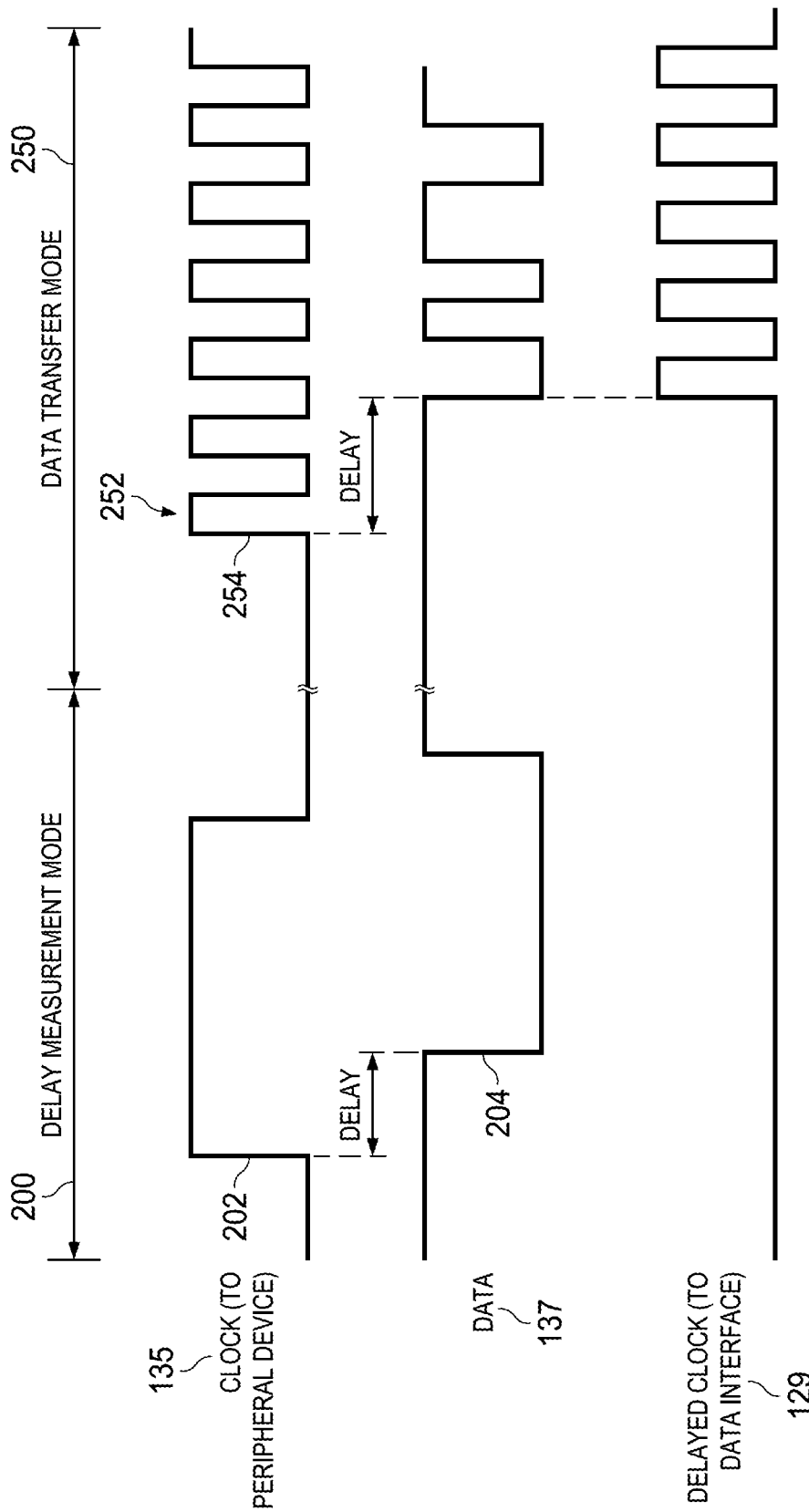
FIG. 3 illustrates a timing diagram in accordance with various examples.

Reference is now made to the timing diagram of FIG. 3, along with the block diagrams of FIGS. 1 and 2. In accordance with various embodiments, during, for example, an initialization process of the microcontroller (e.g., power-on reset), the microcontroller may operate in a delay measurement mode in which the adaptive clock delay compensator 140 can measure the amount delay associated with the electrical conductors between the microcontroller 110 and the peripheral device 120. During the delay measurement mode, the CPU 130 sends a request signal to the state machine 154 of the adaptive clock delay compensator 140 to make a delay measurement. The state machine 154 responds to the request from the CPU by configuring the clock generator 156 to generate the CLOCK signal at a relatively low frequency. This particular frequency is substantially lower than the frequency that the clock generator will generate for the CLOCK signal during a subsequent data transfer mode. In one example, the CLOCK frequency during the delay measurement mode is approximately 100 KHz while the CLOCK frequency during the subsequent data transfer mode is 100 times or more greater than that (e.g., 10 MHz, 16 MHz, etc.).

The timing diagram of FIG. 3 illustrates an example of three signals. The top signal 135 is the CLOCK signal generated by the clock generator 156 of the adaptive clock delay compensator 140 and provided to the peripheral device 120. The middle signal 137 is the DATA signal generated by the peripheral device 120 and returned to the microcontroller 110. The bottom signal 129 is the DELAYED CLOCK signal generated by the adaptive clock delay compensator 140 and provided to the data interface 136. The timing of the CLOCK and DATA signals 135, 137 during the delay compensation mode is illustrated at 200 in FIG. 3. During this mode, the CLOCK signal 135 is initiated by the clock generator 156 upon request by the state machine 154. The initial rising edge of the CLOCK signal is illustrated at 202. This edge is transmitted by the clock generator 140 to the peripheral device 120 via the interface circuit 112. The peripheral device 120 receives edge 202 and responds by asserting a DATA signal edge 204. Due to the length of the conductor on which the CLOCK and DATA signals 135, 137 traverse (and possibly other factors), there will be a time delay between edges 202 and 204 designated as DELAY in FIG. 3.

Upon detection of initial clock edge 202 by the edge detector 150, the counter 152 begins counting clock cycles of the high frequency clock 153, which has higher frequency than the frequency of CLOCK itself during the delay measurement mode 200. Upon detection of the subsequent edge 204 of DATA from the peripheral device, the counter 152 stops counting clock cycles of the high frequency clock 153 and stores the count value in register 142. The count value represents the number of cycles of the high frequency clock 153 that occurred between CLOCK edge 202 and DATA edge 204. The period of one cycle of the high frequency clock 153 is known and thus the length of the DELAY measured in units of time (rather than a clock cycle count value) as computed by the state machine 154 can alternatively be stored in register 142.

During data transmission operations, however, the clock generator 156 is configured by the state machine 156 to generate CLOCK at a higher frequency than was the case during the delay measurement mode 200, but at a lower frequency than the high frequency clock 153. Because the count value in register 142 specifies the delay value DELAY in terms of number of cycles of the high frequency clock 153, the CPU 130 converts the DELAY value to a different clock domain. Specifically, the CPU 130 converts DELAY from the clock domain of the high frequency clock 153 to the clock domain of the clock to be used during data transfer operations. The CPU 130 may read the current count value from register 142 and then convert it the new clock domain as follows:

$$\text{DELAY\_B} = \text{count} * \frac{\text{high frequency clock frequency}}{\text{data transfer clock frequency}}$$

where "count" is the current count value from register 142 and represents the number of clock cycles during DELAY in the high frequency clock domain, "high frequency clock frequency" is the frequency of the high frequency clock 153, "data transfer clock frequency" is the frequency to be used for CLOCK during a data transfer mode, and DELAY_B is the newly calculated value of DELAY in a different clock domain. The DELAY_B value represents the count value of cycles of a lower frequency data transfer clock that approximately equates to the same period of time corresponding to the number of cycles of the higher frequency clock 153 counted during the delay period.

The DELAY_B value is an integer value in at least some embodiments. Accordingly, the time period represented by DELAY_B based on the data transfer clock frequency may not be exactly the same as the time period represented by the number of cycles of the high frequency clock 153 counted by the counter 152.

Once the CPU 130 converts the count value from the high frequency clock domain to the lower data transfer clock domain (the resulting value referred to as "DELAY_B" above), that value is written by the CPU 130 to register 142. In some embodiments, the CPU overwrites the prior count value in register 142 with newly calculated DELAY_B value.

During a subsequent data transfer mode 250, based on an operation performed by the CPU 130, the CPU 130 initiates a data transfer operation with the peripheral device 120. The CPU may receive data from, or send to data to, the peripheral device 120. The CLOCK frequency for the data transfer mode 250 is configured by the state machine 154 to be a higher frequency than the frequency used during the delay measurement mode, but lower than the high frequency clock 153. The state machine 15 configures the clock generator 156 to generate CLOCK at the desired frequency to the peripheral device. At 252, FIG. 3 illustrates a waveform for CLOCK. As can be seen the frequency of CLOCK during the data transfer mode 250 is higher than the frequency of clock used to measure DELAY.

The value in register 142 represents the number of cycles of CLOCK 135 at the frequency of waveform 252 and thus represents the delay period of time before any return data (in the example of the microcontroller 110 reading data from peripheral device 120) can be expected back at the microcontroller. This delay period of time helps the microcontroller avoid attempting to read signals off DATA during the interim period of time before the expiration of the delay period to thereby avoid erroneously reading spurious signals on the DATA signal line 137.

Further, the state machine 154 in the microcontroller 110 configures the clock generator 156 to generate the DELAYED CLOCK 129 to the data interface 136. This clock signal is used by the data interface to clock and receive the data transmitted to it by the peripheral device 120. The state machine 154 configures the clock generator 156 to begin generating the DELAYED CLOCK 129 at the end of the DELAY time period following the initial edge 254 of CLOCK 135 during the data transfer mode 250. The number of clock cycles comprising the DELAYED CLOCK 129 as generated by the clock generator 156 also may be controlled by the state machine depending on the particular communication protocol implemented by the data interface 136. Thus, the state machine may assert a signal to the clock generator to generate a predetermined number of cycles of the DELAYED CLOCK 129 during the data transfer mode.

During the data transfer mode 250, the state machine 154 asserts signals to the clock generator 156 to generate two clocks at the same frequency but one clock (DELAYED CLOCK 129) being provided to the data interface with a time delay relative to the other clock (CLOCK 135) which is transmitted to the peripheral device. The amount of delay (DELAY) was previously measured during the delay measurement mode 200 and may vary from application to application based on, for example, length of the electrical cable interconnecting the microcontroller 110 and the peripheral device 120.

Figure 4:
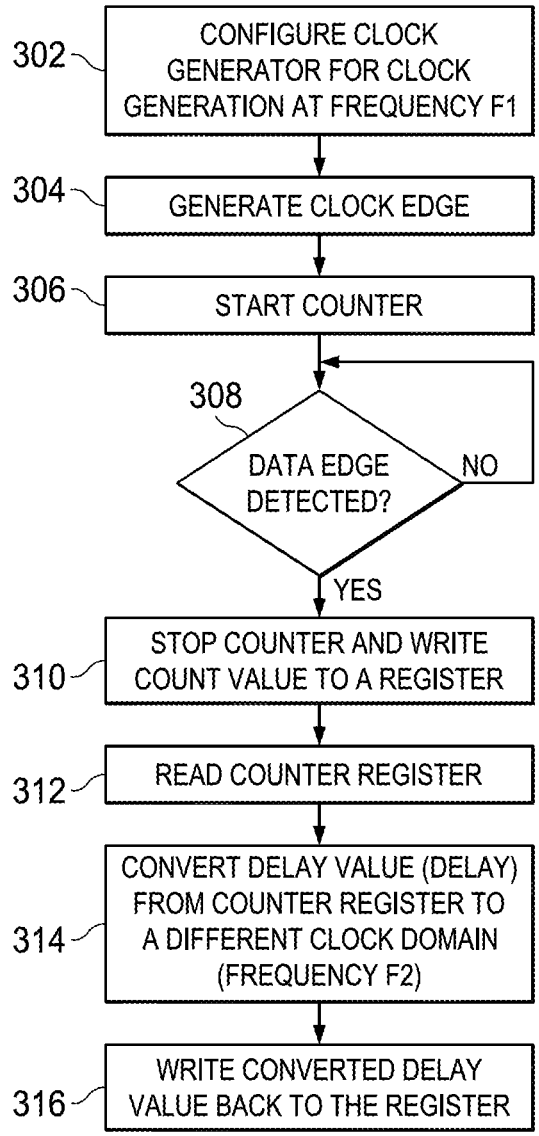
FIG. 4 shows a method for the adaptive clock delay compensator to measure the time delay in a communication system in accordance with various examples.

FIG. 4 shows an example of a method for measuring the delay in accordance with various embodiments. The operations may be performed in the order shown, or in a different order. Further, two or more of the operations may be performed concurrently instead of sequentially. The method may be initiated by the CPU 130 such as during an initialization process of the microcontroller 110. The CPU 130 may assert a signal to the state machine 154 to initiate the delay measurement mode of operation.

At 302, the method includes configuring the clock generator 156 for generation of a clock signal at a first frequency, designated as "F1" in FIG. 4. The state machine 154 may configure the clock generator 156 to generate CLOCK at the F1 frequency. In some embodiments is low enough that the return data edge 204 (FIG. 3) is expected to be received before the next edge of CLOCK while at frequency F1.

At 304, the method includes generating a clock edge of CLOCK to the peripheral device 120. An example of such an edge is illustrated at 202 in FIG. 3. The clock generator 156 generates this edge. At 306, the counter 152 begins counting clock cycles of the high frequency clock 153. The counter 152 may initiate its counting as a result of the edge detector 150 detecting the clock edge generated in 304. Per 308, the counter 152 continues counting cycles of the high frequency clock 153 until the edge detector 150 detects the leading edge of the data signal DATA. Once the data edge is detected at 308, then at 310 the counter 152 stops counting cycles of the high frequency clock 153 and writes the resulting count value (indicative of DELAY) to register 142.

At 312, the count value is read from the register. In some embodiments, the CPU 130 reads the count value. The count value is based on the clock domain of the high frequency clock 153, and thus at 314, the CPU converts the count value (DELAY) to a different clock domain of frequency F2. Frequency F2 is the frequency implemented by the clock generator 156 for CLOCK during a data transfer mode. In some embodiments, F1 is smaller than F2, or alternatively stated F2 is greater than F1. For example, F2 may be ten times or more greater than F1. The CPU 130 then writes the converted delay value (DELAY_B) back to register 142. The DELAY_B delay value may be used during any subsequent data transfer modes of operation.

Figure 5:
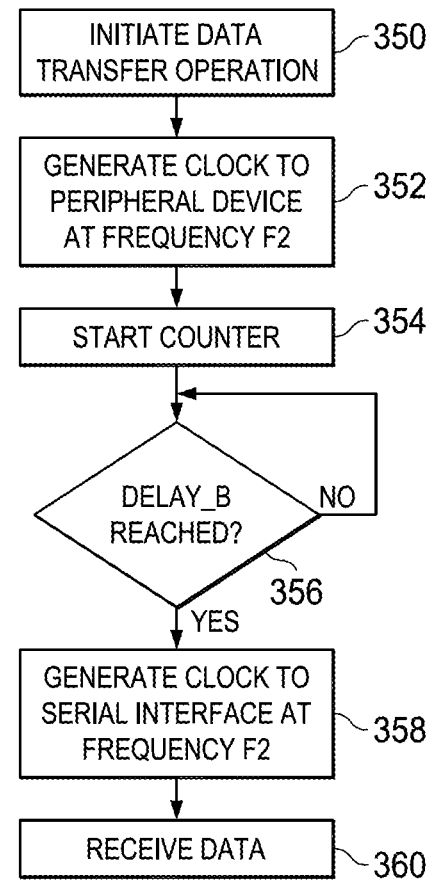
FIG. 5 shows a method by which data can be transferred from a peripheral device to the microcontroller using clocks generated by the adaptive clock delay compensator in accordance with various examples.

FIG. 5 shows an example of a method for a data transfer mode of operation using the delay measured during the delay measurement mode of operation in accordance with various embodiments. The operations may be performed in the order shown, or in a different order. Further, two or more of the operations may be performed concurrently instead of sequentially. The method of FIG. 5 may be initiated by the CPU 130 when a data transfer operation is required such as obtaining a value from the peripheral device 120. The CPU 130 may assert a control signal (CONTROL) 133 to the peripheral device 120 to request, for example, for the peripheral device to return data to the microcontroller 110. At approximately the same time, the state machine 154 at 352 configures and causes the clock generator 156 to begin generating CLOCK at frequency F2 (i.e., the frequency of the data transfer mode).

In some embodiments, the state machine 154 counts for the previously measured delay time period. The state machine 154 may include its own counter that counts the number of cycles of the CLOCK signal equating the value in register 142 (i.e., DELAY_B). In other embodiments, the state machine may cause the counter 152 to count the DELAY_B number of cycles of CLOCK. In this latter embodiment, CLOCK is provided to the counter 152 for counting instead of the high frequency clock 153.

Once the delay time period is reached (e.g., the DELAY_B number of cycles of CLOCK), then at 358, the state machine 154 configures the clock generator 156 to begin generating the DELAYED CLOCK 129 to the data interface. Data will then be transmitted to, and received by, the data interface at 360 and stored in buffer 138 in the data interface. The data interface 136 may not attempt to read data from the DATA signal line until receipt of its DELAYED CLOCK 129 from the adaptive clock delay compensator 140.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a central processing unit (CPU);
a serial interface coupled to the CPU and configured to receive data from a peripheral device; and
an adaptive clock delay compensator coupled to the CPU and to the serial interface and configured to generate a clock signal at a first frequency, detect an edge on a data signal, and count the number of clock cycles of a counter clock to measure the delay between an edge of the clock signal and the detected edge on the data signal to produce a first delay value; and
wherein the CPU is configured to read the first delay value, convert the first delay value to a different clock domain at a second frequency to produce a converted delay value, and initiate a data transfer operation with the peripheral device using the second frequency as a clock signal to the peripheral device; and
wherein the adaptive clock delay compensator is configured by the CPU to generate a delayed clock signal at the second frequency to the serial interface that is delayed from the clock signal at the second frequency to the peripheral device by the converted delay value.

2. The system of claim 1, wherein the second frequency is greater than the second frequency.

3. The system of claim 1, wherein the second frequency is at least 100 times greater than the first frequency.

4. The system of claim 1, wherein the adaptive clock delay compensator includes:
an edge detector configured to detect an edge of the clock signal at the first frequency and the detected edge on the data signal;
a counter to count the number of clock cycles of the counter clock between the detected edges;
a programmable clock generator configured to generate the clock signals at the first and second frequencies, as well as the delayed clock to the serial interface.

5. The system of claim 1, wherein the counter clock has a frequency that is greater than the first frequency and greater than the second frequency.

6. The system of claim 1, wherein adaptive clock delay compensator includes a register in to which the first delay value is stored, and wherein the CPU overwrites the first delay value by the converted delay value.

7. The system of claim 1, wherein the adaptive clock delay compensator is configured to generate the clock signal to the peripheral device at the second frequency during a data transfer mode, and to generate the delayed clock signal at the second frequency to the serial interface for the data interface to receive data from the peripheral device.

8. The system of claim 1, wherein the CPU configures the adaptive clock delay compensator to generate the clock signal at the first frequency, detect the edge on the data signal, and count the number of clock cycles of the counter clock during an initialization process for the system.

9. A system, comprising:
a data interface wherein the data interface receives data from, or sends data to, a peripheral device;
a clock generator wherein the clock generator generates and transmits a first clock signal at a first frequency to the peripheral device;
an edge detector wherein the edge detector detects an edge of the first clock signal and an edge of a data signal in response to the edge of the first clock signal;
a counter wherein the counter counts cycles of a counter clock that occur between the detected edges of the first clock signal and the data signal to produce a first count value, the counter clock having a counter clock frequency;
a central processing unit (CPU) to wherein the CPU converts the first count value to a second count value of a clock domain which has a second frequency that is smaller than the counter clock frequency;
wherein the clock generator changes the frequency of the first clock signal to the second frequency for a data transfer operation and generates and transmits a delayed clock to the data interface for the data transfer operation, wherein the delayed clock is also of the second frequency but is delayed with respect to the first clock by the second count value.

10. The system of claim 9, wherein the first frequency is smaller than the counter clock frequency and smaller than the second frequency.

11. The system of claim 9, further comprising a register into which the first count value is stored by the counter, wherein the CPU reads the first count value from the register and converts the first count value to the second count value based, at least in part, on the counter clock frequency and the second frequency.

12. The system of claim 11, wherein the CPU converts the first count value to the second count value based, at least in part, on a ratio of the second frequency to the counter clock frequency.

13. The system of claim 9, wherein the data interface comprises a serial interface.

14. The system of claim 9, wherein the second frequency is at least 100 times greater than the first frequency.

15. The system of claim 9, further comprising a state machine coupled to the clock generator wherein the state machine asserts a signal to the clock generator to generate a predetermined number of cycles of the delayed clock to the data interface during the data transfer operation.

16. A method, comprising:
generating a clock edge of a clock having a first frequency;
detecting a subsequent data edge;
counting clock cycles of a counter clock between the clock and data edges to produce a first delay value;
converting the delay value to a second delay value based, at least in part, on a second frequency, wherein the second frequency is different than the first frequency;
writing the second delay value to a register;
generating a first clock at the second frequency;
generating a second clock at the second frequency delayed from the first clock by the second delay value;
transmitting the first clock to a remote device and the second clock to the data interface; and
performing a data transfer operation between a remote device and a data interface using a clock having the second frequency.

17. The method of claim 16, wherein generating the second clock at the second frequency delayed from the first clock by the second delay value by counting cycles of the first clock equal to the second delay value, the counting starting with an initial edge of the generated first clock.

\* \* \* \* \*